March 14, 1961  R. D. ANDERSON ET AL  2,975,292
OPTICAL DETECTOR ASSEMBLY

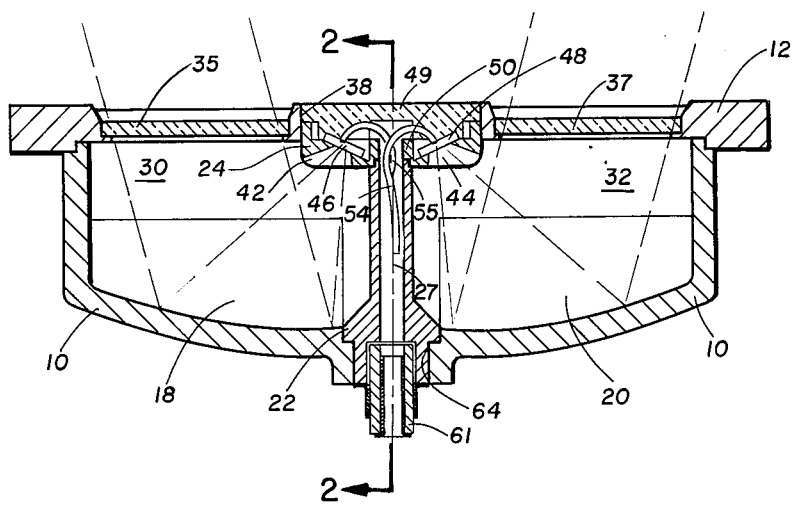
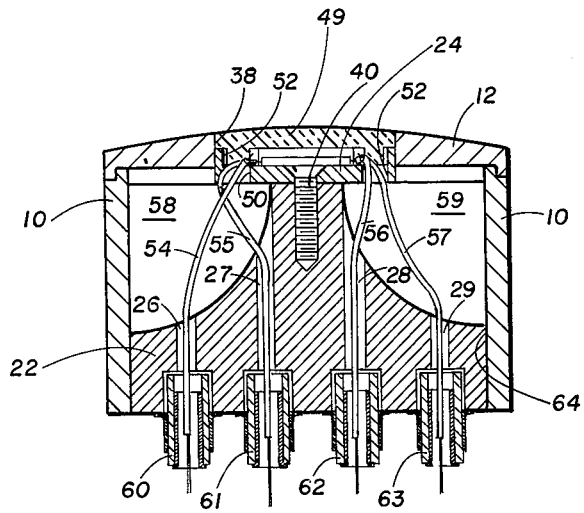

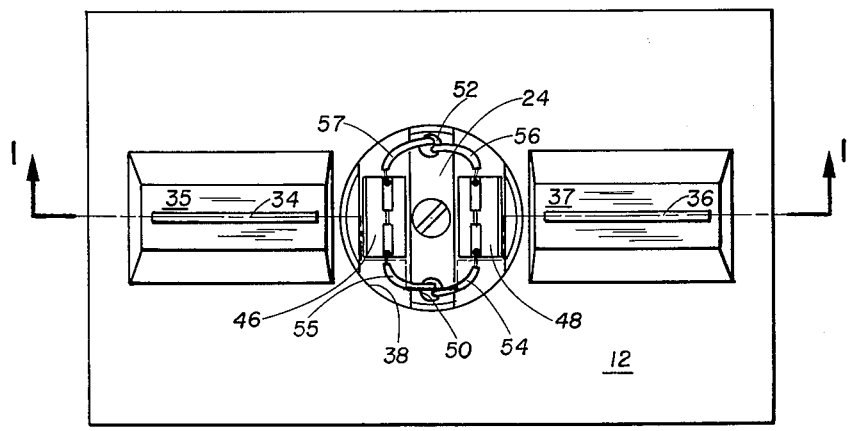
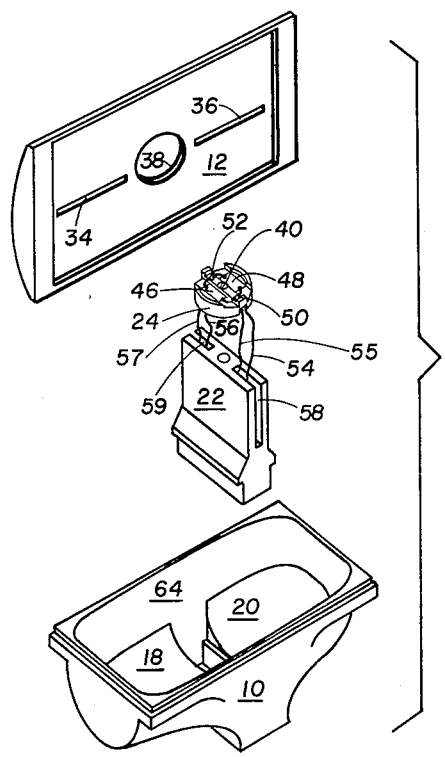

Filed Dec. 23, 1959  3 Sheets-Sheet 3

INVENTOR.
RICHARD D. ANDERSON
JOHN J. NASTRONERO
BY
*J. M. St. Amand*
ATTORNEYS

# United States Patent Office 2,975,292
Patented Mar. 14, 1961

2,975,292

OPTICAL DETECTOR ASSEMBLY

Richard D. Anderson, Riverside, and John J. Nastronero, Corona, Calif., assignors to the United States of America as represented by the Secretary of the Navy Filed Dec. 23, 1959, Ser. No. 861,723

9 Claims. (Cl. 250—216)

(Granted under Title 35, U.S. Code (1952), sec. 266)

The invention described herein may be manufactured and used by or for the Government of the United States of America for governmental purposes without the payment of any royalties thereon or therefor.

The present invention relates to optical detectors and in particular to a hermetically sealed optical detector assembly for detecting infrared electromagnetic radiation or the like.

In many instances it is desirable to provide an optical detector assembly that is able to withstand high temperatures, such as might occur on the surface of a guided missile, without damage while thermally isolating the assembly's infrared detector. It is also desirable to provide such an optical detector that is hermetically sealed and evacuated or filled with an inert, dry atmosphere. Previous to the present invention, optical detector assemblies of this type were moulded of polystyrene plastic, would not withstand high temperature, could not be hermetically sealed and offered no thermal protection to the infrared detector; the previous assemblies also required a larger volume of space, required large windows which required an exceptionally heavy housing of thick cross-section to maintain structural rigidity, and the look-angle of the optics were unsatisfactory for infrared fuzing of guided missiles. The optical detector of the present invention overcomes the disadvantages of the previous detector assemblies in providing an optical detector assembly that is truly hermetically sealed, is more compact, has good structural rigidity and physical dimensions, withstands high temperatures and provides thermal protection for the infrared detectors, improved look-angle of the optics, and is fabricated from non-hygroscopic materials for preserving dry hermetically sealed atmosphere.

It is an object of the invention, therefore, to provide a new and improved optical detector assembly, for detecting infrared electromagnetic radiation, that is truly hermetically sealed and provides thermal protection for infrared detectors at high temperatures.

Another object of the invention is to provide a novel optical detector assembly having improved look-angle, structural rigidity, and simplification of parts.

It is a further object of the invention to provide a new and improved optical detector assembly in which two optical systems are placed back-to-back in a small and compact symmetrical package for both economical and operational advantages.

Still another object of the invention is to provide a plurality of optical detectors in an assembly for providing a relatively uniform response over a full 360° field of view.

Other objects and many of the attendant advantages of this invention will be readily appreciated as the same becomes better understood by reference to the following detailed description when considered in connection with the accompanying drawings wherein:

Figure 1 is a cross-sectional view of a preferred embodiment of the invention, showing an assembly of two optical detectors back-to-back, taken along line 1—1 of Figure 3;

Figure 2 is a cross-sectional view taken along line 2—2 of Figure 1;

Figure 3 is a plan view of the preferred embodiment of the invention showing the relative position of the optical windows and the detectors;

Figure 4 is an exploded perspective view of the dual optical detector assembly;

Referring now to the drawings, like numerals refer to like parts in each of the figures.

Figure 5:
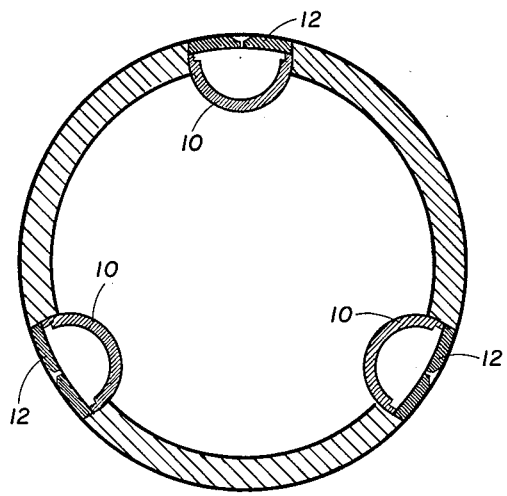
Figure 5 is a diagrammatic cross-sectional view showing an embodiment using three optical detectors per channel.

The main components of the optical detector assembly, comprising a housing 10, top cap 12, a divider and cell supports, are fabricated of non-porous crystalline substances or metals such as Pyrex glass, stainless steel, quartz, aluminum, etc., for example. Housing 10 is provided with mirror or reflector surfaces 18 and 20 at the bottom of the inside surface thereof, as shown in Figures 1 and 4. A divider portion 22, which acts as a support for cell mount 24, is provided with four lead-through passages 26, 27, 28 and 29 and is mounted in housing 10 between reflector surfaces 18 and 20 so as to divide the inside of the housing into two equal compartments 30 and 32. Top cap 12 sealingly closes housing 10 and may be used as a support for the housing. Top cap 12 is provided with two slit-type openings 34 and 36 having transparent windows 35 and 37, respectively, therein of synthetic sapphire or equivalent to permit the entrance of infrared energy into the system, Figures 1, 3 and 4. If desired each opening 34 and 36 may be provided with two such windows having an evacuated space therebetween acting as an excellent thermal insulation. Top cap 12 is also provided with a central aperture 38 which sealingly fits about the periphery of cell mount 24.

Cell mount 24 supported on divider portion 22 is held firmly in place by means of screw 40, for example. The cell mount is provided with apertures 42 and 44 over which infrared detector cells 46 and 48 are mounted, respectively, and is also provided with openings 50 and 52 through which wires 54, 55, 56 and 57 connected to cells 46 and 48, pass. The detector cells and lead wires are rigidly sealed in place by means of a potting compound 49. Wires 54, 55, 56 and 57 pass out of the assembly housing through grooves 58 and 59, through lead-through passages 26, 27, 28 and 29, respectively, which are sealed, and through sealed conductors 60, 61, 62 and 63, respectively. Each lead-through wire is soldered to the inner plate of its respective conductor, each sealed conductor being mounted in an enlarged portion of a respective passage at the bottom of divider portion 22 and extends out beyond the bottom thereof. The bottom of divider portion 22 is seated in an aperture 64 at the bottom of housing 10 and sealed conductors 60, 61, 62 and 63 extend out beyond the bottom of the housing. Infrared detector cells 46 and 48 are mounted on cell mount 24 at a desired angle to receive focused incident infrared rays from a target source reflected from optical reflector surfaces 18 and 20 which are designed so as to reflect infrared energy striking the surface thereof from an infrared source within the field of view through windowed slits 34 and 36 onto the surface of the detector cells.

The infrared detector cells 46 and 48 may be the lead sulphide type, for example, made by depositing lead sulphide over gold electrodes on a glass slide. A gold backing is placed over the lead sulphide to increase the effective sensitivity of the cell. After the cells have been made and aged, they are selected in sets for matched resistance and sensitivity.

Figure 6:
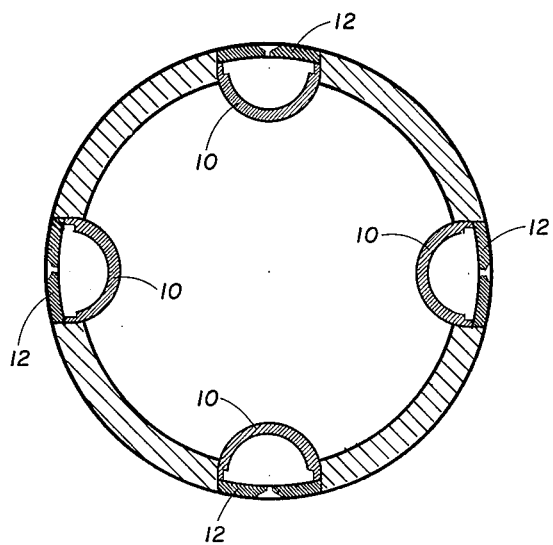
Figure 6 is a diagrammatic cross-sectional view showing an embodiment using four optical detectors per channel.

A complete assembly may comprise three housing units, Figure 5, or four housing units, Figure 6, or more or less as desired, each containing two detector sets, with each set comprising a detector cell, an optical reflector and a transparent window, back-to-back. In a housing unit, Figure 1, one detector set looks forward, for example, at an angle, while the other detector set looks back at an angle. When an assembly comprises a plurality of housing units the cells of the detector sets from each double unit, Figure 1, looking in one direction are wired together in series-parallel forming one channel, and the cells of the detector sets looking in the other direction are wired together in series-parallel forming a second channel.

Figures 5 and 6 are representative of a cross-section of a missile or other vehicle having a plurality of detector systems mounted thereabout for greater field of view.

The operation of the present invention for fuzing is based on the premise that modern aircraft power plants or similar target vehicles or the like radiate sufficient infrared energy for a suitable passive detection system to use as a criterion for fuze function. An infrared fuze for a guided missile limited essentially to tail chase tactical engagements must recognize as nearly as possible the position of closest approach to a source of radiant energy on the target and function to detonate a warhead at this point or after a prescribed delay time, for example.

In the present device infrared radiant energy from a target passes through a sapphire window and slit aperture 34 or 36 of the optical detector assembly; a spectrally selective filter may be deposited on the window to eliminate any unwanted wavelengths. To insure that no other source of infrared energy will cause the fuze to function in the absence of a target each optical detector assembly of this invention has two optical systems each of which always view a different area than the other. The sun creates a higher energy density in the near infrared spectral region than other targets would and could trigger a single-channel optical fuze. However, the present device requires signals simultaneously in both channels to trigger a fuze. Clouds, bright sand, snow and sources of reflected infrared energy which might be viewed simultaneously by both channels must not be permitted to produce signals at the detector above a certain maximum threshold level; the spectrally selective filter deposited on the windows to eliminate unwanted wavelengths is used for accomplishing the desired result. A signal amplifier can also be used to limit the signal pass-band and to place other requirements on the signal pulse shape.

If the source of infrared energy, i.e. the target, has the proper angular bearing, in relation to the detector assembly, radiation therefrom will pass through the windows and slits 34 and 36 onto the reflector surfaces 18 and 20 which will reflect and focus the radiation onto the photoconductive infrared detector cells 46 and 48 thus producing an electrical signal output. This signal may then be used for fuzing or other triggering purposes or the like.

Each optical detector could be constructed separately, for economic or other advantages, instead of as a double unit of two identical systems placed back-to-back, Figures 1–4, as described herein, and mated together in the final assembly.

Obviously many modifications and variations of the present invention are possible in the light of the above teachings. It is therefore to be understood that within the scope of the appended claims the invention may be practiced otherwise than as specifically described.

What is claimed is:

1. An optical detector assembly comprising a plurality of housings and closures therefor each hermetically sealed and fabricated from non-hygroscopic materials, a wall portion within said housing dividing the interior thereof into two separate compartments, an optical reflective surface formed on an inner surface of each of the compartments of said housing for reflecting and focusing electromagnetic energy, said closure covering each of said compartments and provided with a slit-type aperture over each compartment, each of said slit apertures provided with a transparent window therein to permit the entrance of electromagnetic radiant energy of desired wavelength into the housing, a detector cell mounted within each compartment of said housing at an optimum angle for having focused thereon by the reflective surface in the compartment reflected electromagnetic radiant energy from a target source; each optical detector compartment with its reflective surface, slit-aperture window and detector cell operating to look in a different direction from the other and each having a different field of view, each said detector cell operable to produce an electric signal when electromagnetic radiant energy of desired wavelength impinges thereon, the detector cells looking in one direction in each of said plurality of housings forming one channel and the detector cells looking in the other direction forming another channel, whereby when a detector cell from each channel has electromagnetic radiant of a desired wavelength impinge thereon simultaneously a desired electric signal is produced.

2. A device as in claim 1 wherein said transparent window comprises two transparent layers with an evacuated space therebetween.

3. A device as in claim 1 wherein said transparent window is synthetic sapphire.

4. A device as in claim 1 wherein the interior of said assembly is evacuated.

5. A device as in claim 1 wherein the interior of said housing is filled with an inert gas.

6. A device as in claim 1 wherein said reflective surfaces are formed in the bottom of said housing for focusing electromagnetic radiant energy onto said detector cells.

7. A device as in claim 1 wherein spectrally selective filter is deposited on said transparent windows for filtering out unwanted wavelengths of electromagnetic energy.

8. A device as in claim 1 wherein said wall portion acts as a support for said detector cells.

9. In a guided missile, a plurality of optical detector assemblies each comprising two hermetically sealed compartments back-to-back, each hermetically sealed optical detector assembly comprising a housing and a closure therefor each fabricated from non-hygroscopic materials, a wall portion within said housing dividing the interior thereof into two compartments, an optical reflective surface formed on an inner surface of each of the compartments of said housing for reflecting and focusing electromagnetic energy, said closure covering each of said compartments and provided with a slit-type aperture over each compartment, each of said slit apertures provided with a transparent window therein to permit the entrance of electromagnetic radiant energy of desired wavelength into the housing, a detector cell mounted within each compartment of said housing at an optimum angle for having focused thereon reflected electromagnetic radiant energy from a target source; each optical detector compartment with its reflective surface, slit-aperture window and detector cell operating to look in a different direction from the other and each having a different field of view, each said detector cell operable to produce an electrical signal when electromagnetic radiant energy of desired wavelength impinges thereon, simultaneous signals from said detector cells being necessary to produce a desired triggering pulse said detector cells being electrically connected to external electrical leads to be operable as a source for triggering pulses, said plurality of optical detectors providing relatively uniform response over a full 360° field of view.

References Cited in the file of this patent

UNITED STATES PATENTS

| | | |
|---|---|---|
| 2,147,156 | Geffecken et al. | Feb. 14, 1939 |
| 2,243,132 | Soller | May 27, 1941 |
| 2,635,193 | Young | Apr. 14, 1953 |
| 2,779,811 | Picciano et al. | Jan. 29, 1957 |
| 2,892,093 | Henderson | June 23, 1959 |
| 2,912,593 | Deuth | Nov. 10, 1959 |